March 12, 1957 H. O. SCHJOLIN 2,784,568
VEHICLE REFRIGERATING APPARATUS
Filed Aug. 3, 1953 2 Sheets-Sheet 1

INVENTOR.
Hans O. Schjolin.
BY R. R. Candor.
His Attorney.

March 12, 1957 H. O. SCHJOLIN 2,784,568
VEHICLE REFRIGERATING APPARATUS
Filed Aug. 3, 1953 2 Sheets-Sheet 2

INVENTOR.
Hans O. Schjolin.
BY R. R. Candor.
His Attorney.

United States Patent Office 2,784,568
Patented Mar. 12, 1957

2,784,568

VEHICLE REFRIGERATING APPARATUS

Hans O. Schjolin, Birmingham, Mich., assignor to General Motors Corporation, Detroit, Mich., a corporation of Delaware Application August 3, 1953, Serial No. 372,006

6 Claims. (Cl. 62—117)

This invention relates to refrigerating apparatus and more particularly to an arrangement for use in air conditioning a transit coach.

It is an object of this invention to provide a low cost air conditioning unit which occupies a minimum amount of space.

More particularly it is an object of this invention to provide a passenger bus with air conditioning equipment which is mounted wholly above the passenger compartment of the bus. Still another object of this invention is to provide an improved air circulating system in a bus air conditioning installation.

Further objects and advantages of the present invention will be apparent from the following description, reference being had to the accompanying drawings, wherein a preferred form of the present invention is clearly shown.

Figure 1:
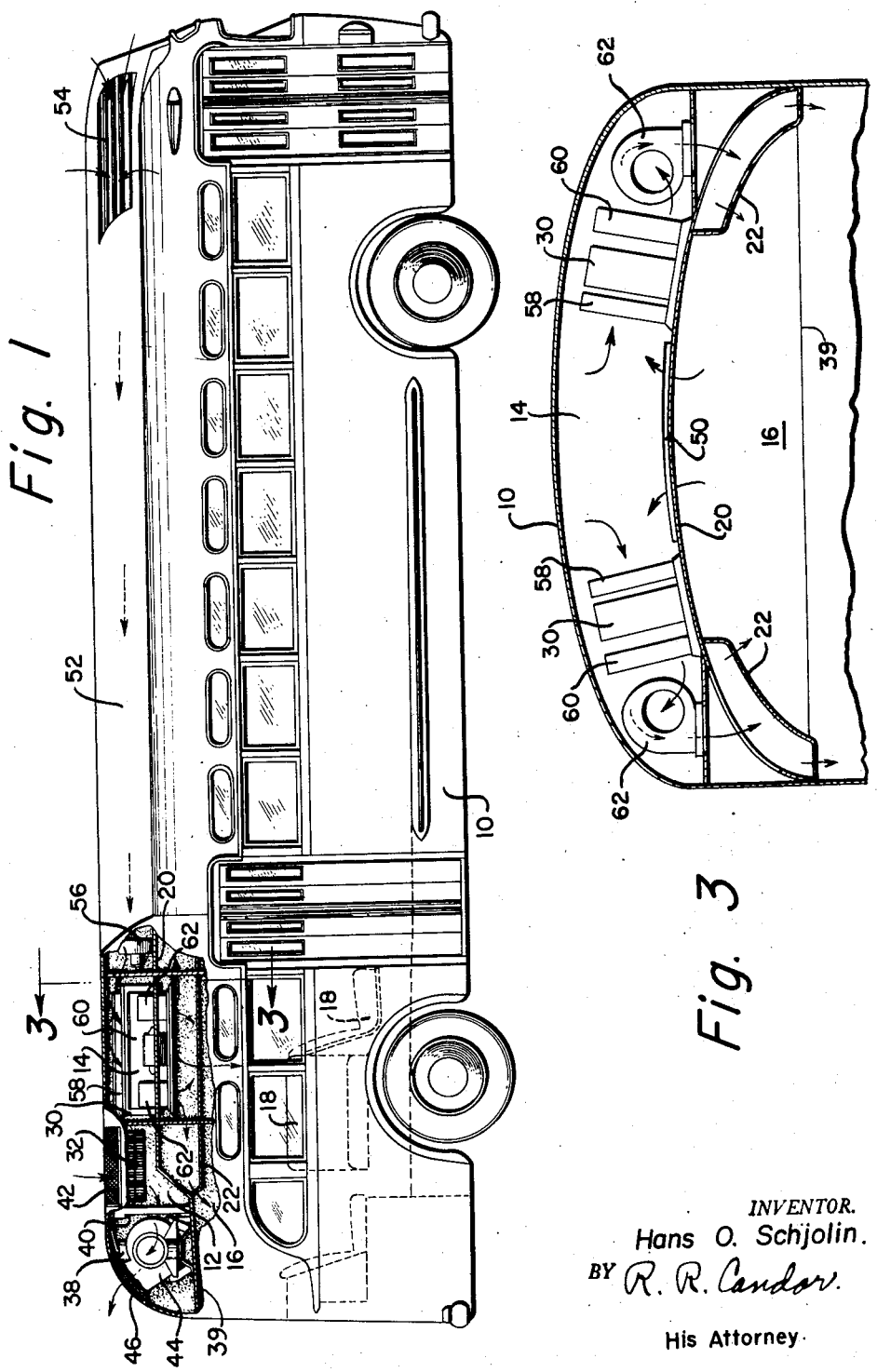
Figure 1 is an elevational view with parts broken away showing the air conditioning equipment mounted in the upper rear portion of a bus.

Referring now to the drawing wherein a preferred embodiment of the invention has been shown, reference numeral 10 generally designates a transit coach or bus of the type used for conveying passengers from one location to another. The upper rear portion of the bus includes a machinery or refrigerant liquefying compartment 12 located directly above the back seat 13 of the bus and an air cooling compartment 14 directly in front of the machinery compartment 12. The bus is provided with the usual passenger compartment 16 in which the usual rows of seats 18 are provided on opposite sides of the passenger compartment in accordance with standard practice. Air distributing ducts 22 extend along the sides of the bus directly beneath the usual ceiling 20 and serve to distribute the conditioned air within the passenger compartment.

The air conditioning equipment includes a pair of refrigerant evaporators 30 mounted in the cooling chamber 14, a pair of refrigerant condensers 32 and a refrigerant compressor 34 mounted in the machinery compartment 12. Suitable refrigerant flow connections, generally designated by the reference numeral 36, connect the evaporators, condenser, and compressor in refrigerant flow relationship in accordance with conventional refrigeration practice.

The compressor 34 is directly connected to an internal combustion engine 38 which is also located in the machinery compartment. The engine 38 includes the usual engine radiator 40 which is adapted to be cooled by means of the same air which is circulated over the condensers 32. The condenser cooling air enters the machinery compartment through an air inlet grill 42 arranged in the top wall of the machinery compartment 12 directly above the condenser sections 32 whereby the incoming air first cools the condenser sections 32 and then cools the radiator 40 and the machinery in compartment 12. A pair of blowers 44 which are directly driven by the main engine 38 are provided for circulating air in through the air inlet grill 42 and out through rear outlet grill means 46 in the upper rear corner of the machinery compartment. It will be noted that the engine 38 is mounted directly above the rear seat of the passenger compartment and that the floor 39 of the engine compartment 12 is slightly lower than the main ceiling 20 of the passenger compartment only at the very rear of the bus where the passengers never stand.

Figure 2:
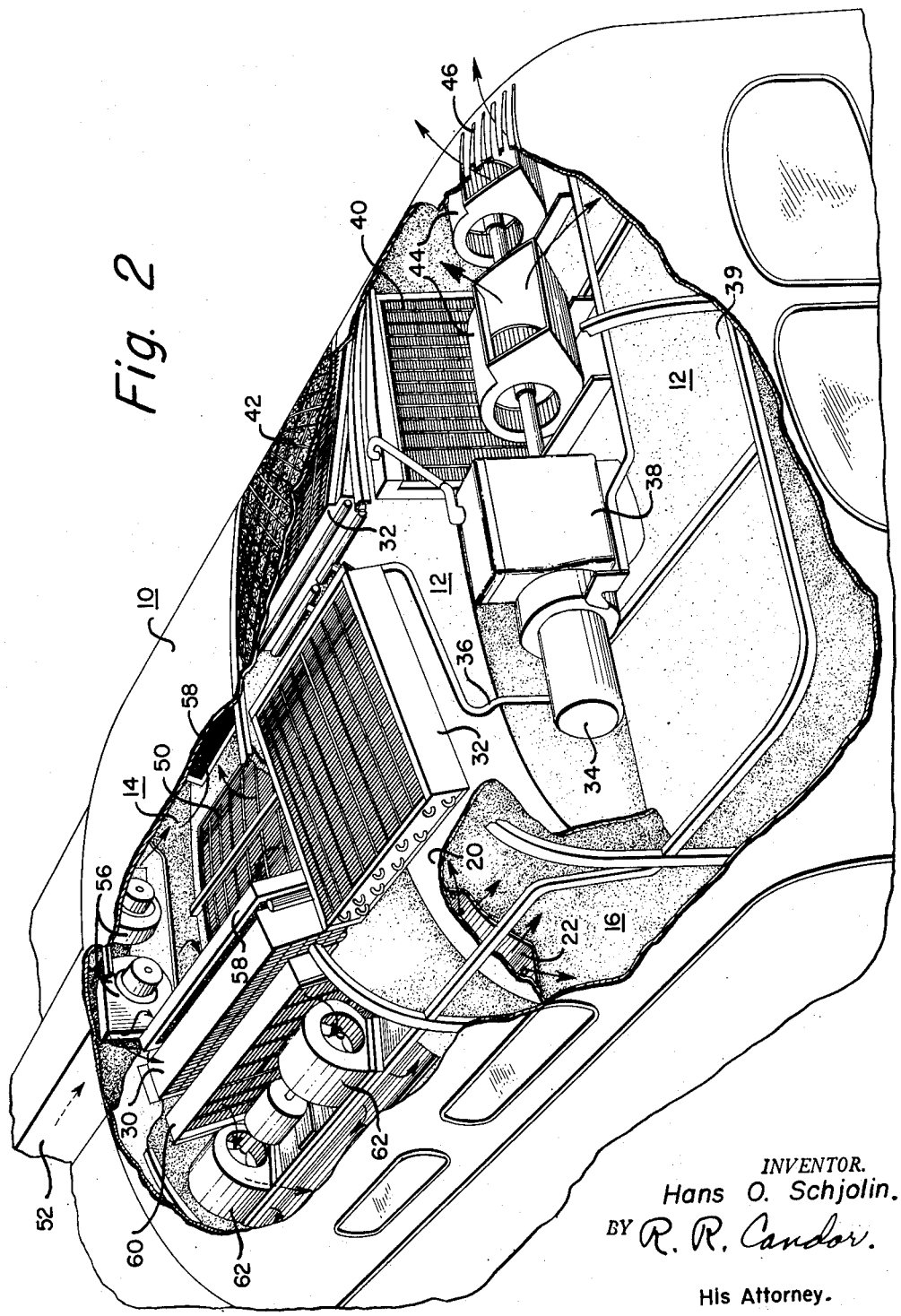
Figure 2 is a fragmentary pictorial view with parts broken away showing somewhat diagrammatically the arrangement of the air conditioning equipment in the bus; and, Figure 3 is a fragmentary sectional view taken substantially on line 3—3 of Figure 1.

The air to be conditioned for the passenger compartment consists of a mixture of fresh air and return air. The return air enters the cooling compartment 14 through a return air inlet grill 50 located in the ceiling of the bus as best shown in Figures 2 and 3. The fresh air is introduced to the air conditioning unit through a fresh air duct 52 located on the roof of the bus. As best shown in Figures 1 and 2 the duct 52 is mounted above the central portion of the passenger compartment ceiling and extends from the front of the bus to the air cooling compartment 14. The fresh air enters the duct 52 through one or more air inlet grills 54 located adjacent the front end of the duct 52. A pair of blowers 56 having their inlets connected to the rear end of the duct 52 and discharging into the cooling compartment 14 are used for forcefully pulling fresh air through the duct 52. Air filters 58 are provided as shown for filtering all of the air to be cooled before the air contacts the evaporators 30. Heater coils 60 are also mounted in the compartment 14 along side the evaporators 30 for heating the air in the winter. These heaters could also be used for reheating the air when the refrigerating system has more capacity than necessary for cooling the air. A pair of blowers 62 are provided as shown adjacent each side of the air cooling compartment 14 and serve to forcefully discharge the conditioned air downwardly into the air distributing ducts 22 as best shown in Figure 3.

By virtue of the above described construction and arrangement of parts it is obvious that the air conditioning equipment may be made small and compact and that it does not occupy revenue producing space. Except for the fresh air duct 52 and the enlargement made adjacent the upper rear end of the bus it has not been necessary to increase the size of the bus in order to accommodate the air conditioning equipment.

While the form of embodiment of the invention as herein disclosed constitutes a preferred form, it is to be understood that other forms might be adopted, as may come within the scope of the claims which follow.

What is claimed is as follows:

1. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, upright refrigerant evaporating means extending generally parallel to and spaced from each side wall of the vehicle with the evaporating means spaced apart to form an inlet space, the ceiling beneath the inlet space being provided with a recirculating air inlet, a distributing discharge duct means extending along each side of the passenger compartment, and fan means located between each of the evaporating means and the adjacent side walls having their inlets communicating with the outer side of each evaporating means and having their outlets discharging into the discharge duct means.

2. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, upright refrigerant evaporating means extending generally parallel to and spaced from each side wall of the vehicle with the evaporating means spaced apart to form an inlet space, the ceiling beneath the inlet space being provided with a recirculating air inlet, a distributing discharge duct means extending along each side of the passenger compartment, and fan means located between each of the evaporating means and the adjacent side walls having their inlets communicating with the outer side of each evaporating means and having their outlets discharging into the discharge duct means, said upright wall having a fresh air inlet exposed to the air above the roof located between the evaporating means and communicating with said inlet space.

3. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, said vehicle having a rear end wall, said ceiling extending from said upright wall to said end wall, a second upright wall located between said first mentioned upright wall and said end wall, said roof having an inlet opening located between said upright walls, a condenser extending in series with said inlet opening in said roof, an internal combustion engine and a compressor driven by said internal combustion engine located above the ceiling beneath the roof between the second upright wall and the end wall, said second upright wall having an opening therein, a radiator for said engine located in series with the opening in said second upright wall, a discharge opening in the roof between said second upright wall and the end wall, and means for circulating air through said inlet opening and said condenser and said opening in the second upright wall and said radiator and discharging the air through said discharge opening.

4. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, said vehicle having a rear end wall, said ceiling extending from said upright wall to said end wall, said upright wall having an opening therein, said vehicle having an external inlet opening connecting with said opening, a motor compressor and fan means connected together and extending in general horizontal alignment generally parallel to said end wall above said ceiling between the upright wall and said end wall, a condenser located in series with said openings operatively connected to said compressor, said vehicle having a discharge opening, said fan means having means for circulating air through said inlet opening and said condenser and said opening in said upright wall and discharging the air through said discharge opening.

5. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, said vehicle having a rear end wall, said ceiling extending from said upright wall to said end wall, said upright wall having an opening therein, said vehicle having an external inlet opening connecting with said opening, an internal combustion engine and a compressor and an exhaust fan having connected shafts extending in general horizontal alignment generally parallel to said ceiling between the upright wall and the end wall, a condenser connected to said compressor and a radiator connected to said engine both located in series with the opening in said upright wall, said vehicle having a discharge opening connected to the discharge of said exhaust fan.

6. A vehicle provided with a roof and side walls and a passenger compartment beneath the roof within the side walls, a compartment beneath the roof provided by a ceiling above a portion of the passenger compartment spaced beneath the roof and an upright partition wall extending between the ceiling and the roof, upright refrigerant evaporating means extending generally parallel to and spaced from each side wall of the vehicle with the evaporating means spaced apart to form an inlet space, the ceiling beneath the inlet space being provided with a recirculating air inlet, a distributing discharge duct means extending along each side of the passenger compartment, and fan means located between each of the evaporating means and the adjacent side walls having their inlets communicating with the outer side of each evaporating means and having their outlets discharging into the discharge duct means, said upright wall having a fresh air inlet exposed to the air above the roof located between the evaporating means and communicating with said inlet space, said vehicle having a rear end wall, said ceiling extending from said upright wall to said end wall, second and third upright walls located in spaced relation between first mentioned upright wall and the end wall above said ceiling, an internal combustion engine and a compressor and an exhaust fan located above the ceiling beneath the roof between the third upright wall and the end wall, said roof having an inlet opening located between said second and third upright walls, a condenser connected to said compressor extending in series with said inlet opening in said roof, said third upright wall having an opening therein, a radiator for said engine located in series with said opening in said third upright wall, and refrigerant circuit connections, connecting said evaporating means with said condenser and compressor.

References Cited in the file of this patent

UNITED STATES PATENTS

| | | |
|---|---|---|
| 1,966,164 | Clark | July 10, 1934 |
| 2,311,622 | Alexander et al. | Feb. 23, 1943 |
| 2,475,841 | Jones | July 12, 1949 |
| 2,496,751 | Ritter | Feb. 7, 1950 |
| 2,525,869 | Corhanidis | Oct. 17, 1950 |
| 2,541,921 | Henny | Feb. 13, 1951 |
| 2,569,009 | Kuempel | Sept. 25, 1951 |
| 2,635,432 | Kleist | Apr. 21, 1953 |
| 2,667,336 | Lehane et al. | Jan. 26, 1954 |
| 2,678,546 | Campbell | May 18, 1954 |